Patented Nov. 2, 1926.

1,605,582

UNITED STATES PATENT OFFICE.

GEORGE W. HEISE, OF BAYSIDE, NEW YORK, ASSIGNOR TO NATIONAL CARBON COMPANY, INC., A CORPORATION OF NEW YORK.

DEPOLARIZING COMPOSITION AND PROCESS OF MAKING THE SAME.

No Drawing. Application filed October 29, 1923. Serial No. 671,600.

This invention relates to improvements in non-oxidizing, non-conductive, absorbent materials for use in dry cells, particularly those of the Le Clanche type.

The advantages to be obtained by the use of such materials are described in an application Serial No. 610,043, filed on December 30, 1922, by E. C. Smith. According to that invention, diatomaceous earth, or equivalent substance, is associated with the depolarizer. In this way the capacity of the cell for taking up and retaining electrolyte is substantially increased, with resulting improvement in service life. However, the presence of the inert absorptive material raises the internal resistance of the cell to a certain extent. This effect is objectionable in certain types of cell, especially those of small size adapted for use in flashlights or the like.

I have discovered that the electrical resistance of the absorptive material may be reduced to the desired value by coating the material with conductive carbon in finely divided condition. An additional feature of the present invention is the treatment of the absorptive material to remove impurities harmful to the cell.

Various non-conductive, inert absorptive materials may be used, for example diatomaceous earth or similar siliceous substances, pumice, or porous ceramic materials. The absorptive materials should be suitably comminuted. Fineness of about 200 mesh is desirable.

Conductive carbon in finely divided state may be obtained from a number of sources. Carbon conditioned by milling with an abrasive, as described in my application Serial No. 607,908, filed December 19, 1922, gives excellent results. Such carbon is in a physical condition which enables it to attach itself readily to the absorptive particles. The attached film or coating of carbon gives the particles satisfactory conductivity.

Generally the carbon will be separated from the abrasive with which it was milled, before admixture with the absorptive material. However, some or all of the abrasive, such as sand, may be retained. While non-absorptive itself, the sand tends to increase the absorptive capacity of the depolarizing composition as a whole. In my application above referred to, it has been shown that the presence of sand within reasonable limits does not substantially increase the internal resistance of the cell. This effect is ascribed to the covering of the sand particles with a conductive carbonaceous coating.

Deflocculated graphite, lampblack, or finely-divided conductive carbon of other sorts may also be used.

The particles of diatomaceous earth or equivalent material may be coated with carbon by thoroughly mixing them with it. This should generally be done before admixture with the depolarizing compound. Compositions containing such compound, for example manganese dioxid, and an inert absorbent, may however be subjected to the carbon coating treatment. Or mixtures of carbon and depolarizer may be associated with the inert absorbent. Whatever the order of mixing adopted, the materials must be brought into intimate contact. In suitably prepared batches the absorbent appears to be coated with carbon. In the prior process of mixing an absorbent with manganese dioxid and carbon, as described in application Serial No. 610,043, referred to above, no attempt was made to secure this effect and the procedure was not adapted to produce it.

In some cases it is desirable to condition the carbon and coat the absorptive material simultaneously. This may be done by substituting the absorptive material for the abrasive in the joint milling process of my application referred to above. Generally from 10% to 30% of the weight of the charge may advantageously be absorptive material.

Diatomaceous earth and like materials are sufficiently hard to exert the required abrasive action upon the carbon. Their absorptive capacity is not substantially impaired by the milling. Depolarizer may or may not be milled with the carbon and absorbent. The materials may be mixed or milled either in dry state or in presence of water or other suitable liquid.

Wide variation in the proportions of inert, non-conductive absorbent, carbon, and depolarizer is possible. By way of example only it may be stated that 5 parts of finely-divided carbon is usually adequate to coat properly 100 parts of diatomaceous earth. One suitable depolarizing mix is as follows:

| | Parts by weight. |
|---|---|
| Manganese dioxid | 300 |
| Carbon | 100 |
| Diatomaceous earth coated with carbon | 12 |

Cells containing the carbon-coated inert absorbent ordinarily show about 10% greater service on standard test than do comparable cells in which the inert absorbent is not coated.

I have discovered that it is frequently advantageous to purify the sand or inert absorbent before coating it. This has not been the practice heretofore because these materials ordinarily contain only small amounts of impurities and do not usually form a large part of the depolarizing composition. Tests have shown that the impurities in the absorbent are nevertheless substantially detrimental.

The process of purification will depend upon the substances to be removed. Generally a treatment with dilute acid is satisfactory. For example, sand or diatomaceous earth may be leached with sulfuric acid of about 10% strength. The service capacity of cells containing the purified materials is greater than that of comparable cells in which the material is not acid treated. Apparently the removal of basic ingredients is responsible for this effect. The sand, diatomaceous earth or the like should be washed free from acid and dissolved compounds. Drying is ordinarily not required.

In some cases an increase in service life amounting to about 10%, and other advantages, have been noted when purified absorbent was used, without being coated with carbon. For example, the following is typical of the performance of cells substantially identical except that purified sand was used in one case and not in the other:

| | Volts | Amperes | Minutes of continuous service on 4 ohm test |
|---|---|---|---|
| Water washed sand milled with carbon | 1.59 | 6.5 | 280 |
| Acid washed sand milled with carbon | 1.59 | 7.2 | 330 |

In these cells the depolarizer consisted of manganese dioxid 270 parts by weight, graphite 100 parts, sand 30 parts.

While it may be that sand or absorbent siliceous material from some sources may be so pure that the leaching with acid results in no improvement, this is not true of such materials used in ordinary battery practice.

Additional advantages are obtained by the carbon-coating step and this will generally be taken after the purification.

While it is preferred to mix the coated inert material with the depolarizer, it will be understood that such material may be disposed in one or more layers, or otherwise supplied in any suitable manner. Bobbins or the like may be formed from the improved depolarizing composition, or it may be tamped into the cells.

Various modifications of the illustrative specific procedure described herein may be made within the scope of the appended claims.

I claim:

1. Process of preparing a depolarizing composition which consists in mixing together an oxidizing compound and a material comprising discrete particles of inert, non-conductive material coated with conductive carbon.

2. Process of preparing a depolarizing composition which consists in purifying inert, non-conductive material and mixing the same with an insoluble depolarizer.

3. Process of preparing a depolarizing composition, comprising purifying inert, non-conductive absorbent material, coating the material with conductive carbon, and mixing the coated material with a depolarizing compound.

4. A dry cell depolarizer comprising manganese dioxid, conductive carbon, and carbon-coated inert absorptive material.

5. In a dry cell, a depolarizer comprising manganese dioxid and carbon, and absorptive carbon-coated material associated with said depolarizer and adapted to increase the liquid retaining properties thereof.

6. A mixture comprising conductive carbon and a relatively hard, inert, absorptive material in a physical condition and state of association such as may be produced by prolonged joint milling.

In testimony whereof I affix my signature.

GEORGE W. HEISE.